United States Patent
Knoblauch et al.

(10) Patent No.: US 8,641,568 B2
(45) Date of Patent: Feb. 4, 2014

(54) ELECTRIC MACHINE FOR AN ELECTRIC AXLE OF A MOTOR VEHICLE

(75) Inventors: Daniel Knoblauch, Utergruppenbach (DE); Ulrich Knoedel, Ingersheim (DE)

(73) Assignee: GETRAG Getriebe- und Zahnradfabrik Hermann Hagenmayer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 13/450,292

(22) Filed: Apr. 18, 2012

(65) Prior Publication Data

US 2012/0258831 A1    Oct. 11, 2012

Related U.S. Application Data

(63) Continuation of application No. PCT/EP2010/065238, filed on Oct. 12, 2010.

(30) Foreign Application Priority Data

Oct. 20, 2009    (DE) .................... 20 2009 014 189 U

(51) Int. Cl.
    *F16H 48/30*    (2012.01)
    *F16H 3/72*    (2006.01)
    *B60K 1/00*    (2006.01)
    *H02K 5/16*    (2006.01)

(52) U.S. Cl.
    USPC .............. 475/150; 475/5; 180/65.6; 903/916; 310/90

(58) Field of Classification Search
    USPC ....... 475/5, 150; 180/65.6; 901/916; 903/916
    See application file for complete search history.

(56) References Cited

U.S. PATENT DOCUMENTS

| 1,313,937 | A | * | 8/1919 | Brinton | 180/253 |
|---|---|---|---|---|---|
| 1,858,506 | A | * | 5/1932 | Jacobs | 180/65.6 |
| 5,156,579 | A | * | 10/1992 | Wakuta et al. | 475/161 |
| 5,419,406 | A | * | 5/1995 | Kawamoto et al. | 180/65.6 |
| 5,528,094 | A | * | 6/1996 | Hasebe et al. | 310/112 |
| 5,751,081 | A | | 5/1998 | Morikawa | |
| 6,864,607 | B2 | * | 3/2005 | Hashimoto | 310/75 R |
| 7,621,835 | B2 | * | 11/2009 | Oshidari | 475/5 |
| 2010/0025131 | A1 | * | 2/2010 | Gloceri et al. | 180/65.28 |

FOREIGN PATENT DOCUMENTS

| DE | WO2007/110204 | * | 4/2007 |
|---|---|---|---|
| EP | 1 354 744 A2 | | 10/2003 |
| WO | WO 2007/118082 A2 | | 10/2007 |

* cited by examiner

*Primary Examiner* — David D Le
*Assistant Examiner* — Colby M Hansen
(74) *Attorney, Agent, or Firm* — Knobbe, Martens, Olson & Bear, LLP

(57) ABSTRACT

An electric machine arrangement for an electric axle of a motor vehicle has an electric machine. The electric machine is connected via a gearbox to at least one drive shaft which can be connected to a driven wheel of the motor vehicle. Further, the machine arrangement has a machine housing. The electric machine has a stator fixed to the housing and a rotor which is connected to an input element of the gearbox. The rotor is rotatably mounted on the machine housing by a first and a second rotor bearing section. The first rotor bearing section is connected to a machine output shaft which is connected to the input element of the gearbox. The machine output shaft is guided through the second rotor bearing section in a contactless fashion.

8 Claims, 2 Drawing Sheets

ELECTRIC MACHINE FOR AN ELECTRIC AXLE OF A MOTOR VEHICLE

CROSS-REFERENCES TO RELATED APPLICATIONS

This application is a continuation of international patent application PCT/EP2010/065238, filed on Oct. 12, 2010 designating the U.S., which international patent application has been published in German language and claims priority from German utility model application DE 20 2009 014 189, filed on Oct. 20, 2009. The entire contents of these priority applications are incorporated herein by reference.

BACKGROUND OF THE INVENTION

The present invention relates to an electric machine arrangement for an electric axle of a motor vehicle, having an electric machine which is connected via a gearbox to at least one drive shaft which can be connected to a driven wheel of the motor vehicle, and having a machine housing, wherein the electric machine has a stator fixed to the housing and a rotor which is connected to an input element of the gearbox.

In addition, the present invention relates to an electric axle for a motor vehicle, having two electric machine arrangements of the abovementioned type which are arranged in an essentially mirror-inverted fashion with respect to one another.

In the field of motor vehicle engineering, there is a trend towards electric drives. It is known in this context to combine an internal combustion engine with an electric machine. Such hybrid drive units can be configured in such a way that the electric machine only performs certain additional functions (referred to as a mild hybrid). It is also possible to construct a hybrid drive unit in such a way that both electric operation and operation with an internal combustion engine are possible.

In addition, purely electric drives are also known for motor vehicles, and the motor vehicle therefore has no internal combustion engine at all anymore.

In addition, what are referred to as electric axles are known in which one axle of the motor vehicle is driven in a purely electric fashion. Such electric axles can be installed in a motor vehicle as the sole drive axle. Alternatively it is possible to provide such an electric axle as a second driven axle, wherein a first driven axle is generally driven by a drive unit with a conventional internal combustion engine. In this case, a four-wheel drive can be implemented by means of the electric axle. Alternatively it is also possible to provide two electric axles in a motor vehicle for this purpose.

The electric axles can be constructed in such a way that an electric machine arrangement is combined with a mechanical differential. In addition, what are referred to as tandem drives are known in which the electric axle has two electric machine arrangements which are each assigned to one of the driven wheels of the axle. In this case, a mechanical differential is not necessary. The differential function is implemented by suitable actuation of the electric machines.

For large scale applications, the cost aspect is of particular importance here. In addition to the type and selection of the electric machine and of the gearbox, the type of design of the housing and of the bearing are important parameters here also.

SUMMARY OF THE INVENTION

Against this background, the object of the invention is to specify an electric machine arrangement which can be implemented in a cost-effective way.

The above object is achieved by an electric machine arrangement of the type mentioned at the beginning, wherein the rotor is rotatably mounted on the machine housing by means of a first and a second rotor bearing section, wherein the first rotor bearing section is connected to a machine output shaft which is connected to the input element of the gearbox, and wherein the machine output shaft is guided through the second rotor bearing section in a contactless fashion.

The above object is also achieved by means of an electric axle for a motor vehicle having two electric machine arrangements of the type denoted above which are arranged in an essentially mirror-inverted fashion with respect to one another.

The measure of mounting the rotor by means of a first and a second rotor bearing section, with a machine output shaft being guided through the second rotor bearing section in a contactless fashion, permits a considerable reduction in the necessary bearings for supporting the drive components and gearbox components to be implemented. As a result, a cost-effective design is obtained.

In addition, the machine output shaft can be embodied as a relatively long and flexible shaft. As a result, an input element, connected to the machine output shaft, of the gearbox can be respectively oriented in an optimum fashion.

It is of particular advantage if the gearbox has a planetary gearwheel set, wherein a first element of the planetary gearwheel set forms the input element.

As a result of a planetary gearwheel set, relatively high rotational speeds of the electric machine can be converted to relatively low drive rotational speeds for the driven wheel, wherein only a small installation space is necessary in the axial and radial directions. The gearbox preferably has just one individual planetary gearwheel set which establishes a fixed transmission ratio between the machine output shaft and the drive shaft.

It is of particular advantage if the first element of the planetary gearwheel set is a sun gear.

The sun gear can be mounted on the machine output shaft or formed in one piece herewith.

It is also preferred if a second element of the planetary gearwheel set is rotatably mounted on a gearbox housing which is rigidly connected to the machine housing.

It is of particular advantage here if the second element of the planetary gearwheel set is rotatably mounted on the gearbox housing by means of a single bearing.

The individual bearing can be a double-row roller bearing, for example an angular contact ball bearing, with relatively large dimensions.

It is particularly preferred if the individual bearing is the only bearing for rotationally mounting the planetary gearwheel set.

In addition it is advantageous if the second element of the planetary gearwheel set extends out of the gearbox housing and can be connected to the drive shaft.

In this embodiment, the mounting of the second element also provides a bearing point for the drive shaft.

The second element of the planetary gearwheel set is preferably a planetary carrier on which a multiplicity of planetary gears are rotatably mounted.

In addition, it is advantageous if a first section, extending out of the machine housing and connected to the first element of the planetary gearwheel set, of the machine output shaft is mounted radially by means of the second element of the planetary gearwheel set.

In this embodiment, the machine output shaft is mounted, on the one hand, directly by means of the mounting of the first rotor bearing section and, on the other hand, indirectly by means of the second element of the planetary gearwheel set.

For this reason, only three bearings are necessary for the electric machine arrangement, specifically two bearings for mounting the first and second rotor bearing sections and a single bearing for mounting the planetary gearwheel set.

In addition it is preferred overall if a third element of the planetary gearwheel set is securely connected to the machine housing and/or to a gearbox housing which is rigidly connected to the machine housing.

In this way, a fixed transmission ratio of the planetary gearwheel set can be established.

In this case it is of particular advantage if the third element of the planetary gearwheel set is a ring gear.

As a result, a radially and axially compact design can be implemented.

In addition it is also preferred if a second section, extending out of the machine housing, of the machine output shaft and/or of the first radial bearing section is connected to a sensor arrangement.

The sensor arrangement usually includes an incremental signal generator or the like in order to sense the position or the rotational speed of the rotor. The sensor arrangement is arranged here outside the machine housing, specifically on the second section of the machine output shaft or on the radial bearing section connected thereto.

According to a further, overall preferred, embodiment, the machine housing has a first bearing cover, on which the first radial bearing section is mounted, and a second cover, on which the second radial bearing section is mounted.

The bearing covers can be of relatively solid design in order to be able to absorb the forces which occur.

The third element of the planetary gearwheel set is preferably secured to the second bearing cover from the outside.

In addition it is preferred here if the machine housing has a cylinder section which connects the two bearing covers to one another.

In this way, the machine housing can be of cost-effective design. The cylinder section does not necessarily have to be high-strength here.

However, it is preferred here if the stator is arranged on the cylinder section and if the cylinder section has at least one cavity through which a cooling fluid can flow.

In this way, a cooling of the electric machine can be implemented in a structurally simple way.

In addition it is advantageous overall if the gearbox is accommodated in a gearbox housing in which an oil sump for splash lubrication of the gearbox and/or of a bearing is present, by means of which bearing an element of the gearbox is mounted on the gearbox housing.

In this embodiment, the gearbox housing can be formed, for example, by the second bearing cover from which a section of the gearbox or machine output shaft extends, and by a gearbox housing cover which is connected in a fluid-tight fashion to the second bearing cover.

As a result of the provision of an oil sump, costly injection lubrication is not necessary. In addition, by means of the oil sump the preferably single bearing can also be lubricated, by means of which bearing the second element of the planetary gearwheel set is mounted on the gearbox housing.

In the case of the electric axle, which has two electric machine arrangements of this type, it is of particular advantage if they are arranged in such a way that their respective gearboxes are arranged axially on the outside.

The gearboxes are each preferably arranged on the outside of the second bearing cover here.

Although it would also be conceivable to arrange the gearboxes axially on the inside, that is to say directly adjacent to one another, arranging them axially on the outside also has the advantage that the connection to the rotor can be made via a relatively long machine output shaft which is so flexible that an element of the gearbox which is connected thereto can always orient itself in an optimum way. Furthermore, in the case of a gearbox arrangement which is on the outside, the gearbox output shafts can be directly guided out of the gearbox housings and do not have to be guided through the motor shafts. As a result, the motor shaft bearings can be kept small in terms of diameter (good for high rotational speeds) and the gearbox output shafts may be given sufficient dimensions (no limiting of the diameters owing to maximum permissible bearing diameters).

In addition, with respect to the electric axle it is preferred if the machine housings of the machine arrangements each have a first bearing cover which are connected to one another.

The electric axle can be made available as a premounted unit by connecting the bearing covers.

In this context it is of particular advantage if the first bearing covers of the machine arrangements enclose a sensor space in which respective sensor arrangements of the machine arrangements are accommodated.

In this embodiment, the sensor arrangements are located, on the one hand, in a protected fashion by means of the bearing covers and are axially separated from the gearbox. In addition, an electrical connection to a control device can be relatively easily implemented, since essentially only one electrical connection is necessary for this.

It is therefore of particular advantage if the first bearing covers of the machine arrangements have at least one electrical connection for electrically supplying the electric machine arrangements.

The electrical supply can serve here to energize the stators. However, electrical supply is also intended to refer to the operation of the respective sensor arrangements and the possibility of tapping sensor signals which can then be supplied to an external control unit.

According to a further preferred embodiment, a parking lock arrangement is accommodated in a gearbox housing of only one of the two machine arrangements.

A one-sided parking lock of this type is sufficient for most fields of use. In this context, preferably, the gearbox output shaft or the drive shaft is locked against the gearbox housing by means of the parking lock arrangement.

It is therefore of particular advantage if the parking lock arrangement has a parking lock wheel which is secured to a second element of the gearbox, in particular to the planetary carrier.

The electric machine arrangement according to the invention can preferably not be shifted.

In addition, the electric machine of the electric machine arrangement is preferably embodied as an internal rotor. The gearbox or the planetary gearwheel set is preferably arranged coaxially with respect to the electric machine.

Of course, the features which are mentioned above and which will be explained below can be used not only in the respectively specified combination but also in other combinations or alone without departing from the scope of the present invention.

BRIEF DESCRIPTION OF THE DRAWINGS

Exemplary embodiments of the invention are illustrated in the drawing and are explained in more detail in the following description, in which.

DESCRIPTION OF PREFERRED EMBODIMENTS

Figure 1:
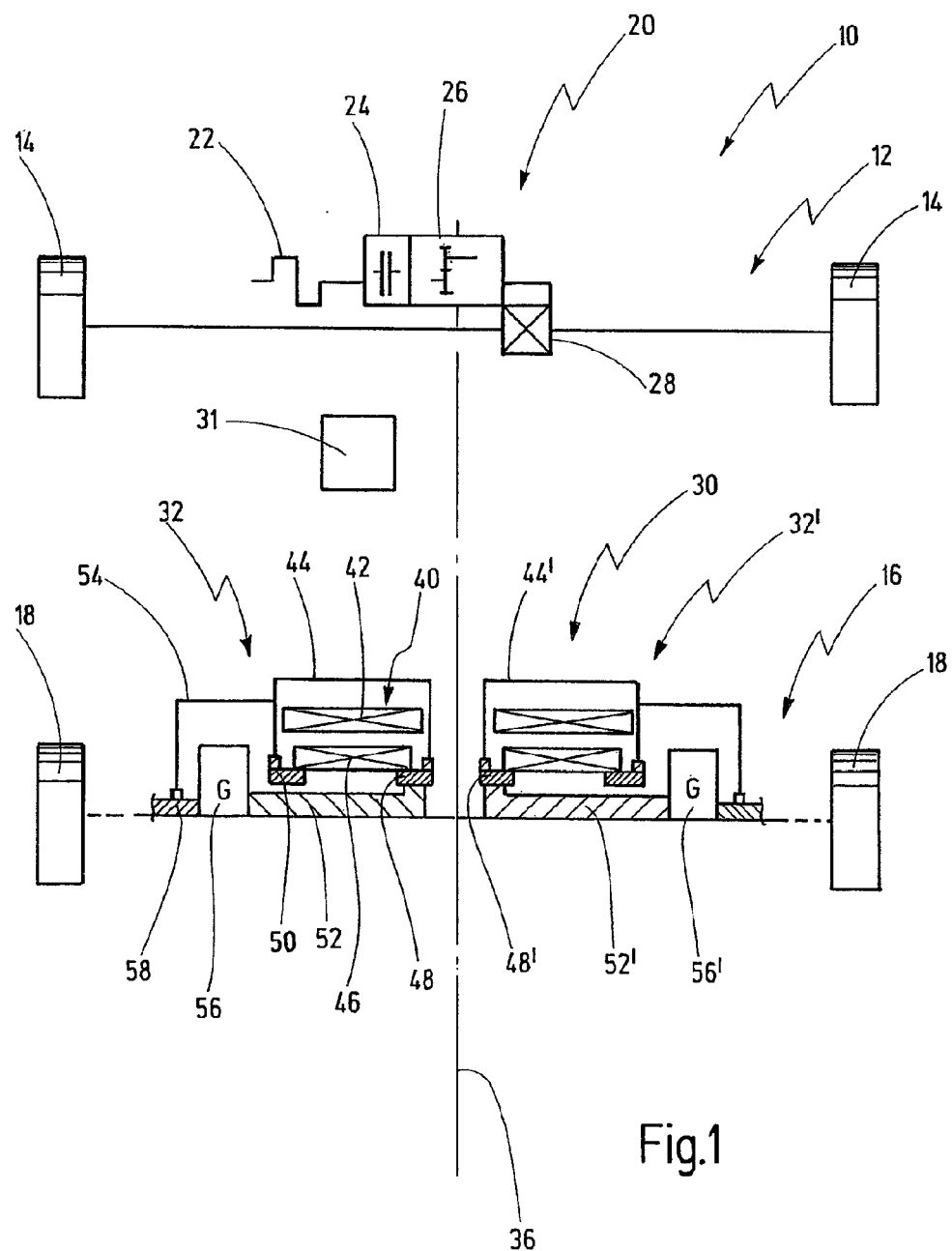
FIG. 1 shows a schematic illustration of a motor vehicle with an electric axle according to the invention.

FIG. 1 is a schematic illustration of a motor vehicle which is denoted by 10. The motor vehicle 10 has a first axle 12 with which two wheels 14 can be driven. In addition, the motor vehicle contains a second axle 16 which is embodied as an electric axle and is configured to drive two wheels 18.

The first axle 12 is assigned a first drive unit 20. The first drive unit 20 includes an internal combustion engine 22, a clutch arrangement 24 and a gearbox 26 such as a multi-step transmission. In addition, the first drive unit 20 has a mechanical differential 28 which distributes the drive power between the two wheels 14.

The second axle 16 has a second drive unit 30. The two drive units 20, are not mechanically connected to one another, but are actuated by means of a superordinate control device 31. The second axle 16 can be configured here to establish all-wheel operation. The second axle can also be provided as the only vehicle drive.

The second drive unit 30 has a first machine arrangement 32 and a second machine arrangement 32'. The two machine arrangements 32, 32' are arranged essentially in a mirror-inverted fashion with respect to a longitudinal axis 36 of the vehicle.

The two machine arrangements 32 can be actuated independently of one another by means of the control device 31. The machine arrangements 32, 32' are each connected here to one of the two wheels 18. A mechanical differential for equalizing the rotational speed between the two wheels 18 is not necessary in this arrangement.

In the text which follows, the machine arrangements are explained essentially on the basis of the first machine arrangement 32. However, the following description can also be applied in the same way to the second machine arrangement 32'.

The machine arrangement 32 has an electric machine 40. The electric machine 40 includes a stator 42 which is secured to a machine housing 44. In addition, the electric machine 40 includes a rotor 46, which is rotatably mounted on the machine housing 44 by means of a first rotor bearing section 48 and a second rotor bearing section 50.

The first rotor bearing section 48 is connected to a machine output shaft 52. The machine output shaft 52 extends from the first rotor bearing section 48 in a contactless fashion through the second rotor bearing section 50 and out of the machine housing 44. Arranged adjacent to the machine housing 44 is a gearbox housing 54 into which the machine output shaft 52 extends and is connected there to an input element of the gearbox. The gearbox 56 also has an output shaft 58 which extends out of the gearbox housing 54 and is connected to a drive shaft 58, not denoted in more detail but, if appropriate, formed integrally therewith and connected to the assigned wheel 18.

The machine arrangements 32, 32' are arranged coaxially with respect to one another and with respect to the second axle 16. The gearboxes 56, 56' are also arranged coaxially with respect to the second axle 16. The first rotor bearing sections 48, 48', which are each connected to the assigned machine output shaft 52, 52', are arranged adjacent to one another. Accordingly, the machine output shafts 52, 52' each extend from a central position in the region of the longitudinal axis 36 of the vehicle to the respective wheels 18 in an axial direction.

In this context, the machine output shafts 52, 52' are indirectly mounted, at their end projecting out of the machine housing 44, by means of the gearbox 56, 56' connected thereto. In this way, the output shafts 52, 52' can each be of relatively long and therefore flexible design. Accordingly, relatively optimum connection of the machine output shafts 52, 52' can be made to the respective gearboxes 56, 56', in particular optimum orientation.

Since the gearboxes 56, 56' are each arranged on the outside in the axial direction (i.e. transverse with respect to the longitudinal axis of the vehicle 36), at least one of the gearboxes 56, 56' can be assigned, in a relatively simple way, a parking lock arrangement which can also be activated relatively easily.

In addition, the bearing concept of the machine arrangements 32, 32' can each be configured in an optimum way. In an ideal case, only two bearings are necessary for mounting the respective rotor bearing sections 48, 50, and one bearing is necessary for mounting the gearbox 56 or the end of the machine output shaft 52 connected thereto.

In the text which follows, a preferred embodiment of such an electric drive shaft 30 is explained with reference to FIG. 2. The basic design and the basic function correspond here to the second drive unit 30 described above. Identical elements are therefore provided with the same reference numbers. The differences are essentially explained in the text which follows.

The machine housing 44 of the first machine arrangement 32 (to which, for the sake of simplicity, exclusive reference is made first) has a first bearing cover 60 which is oriented radially and to which a first bearing 62 for mounting the first rotor bearing section 48 is secured. In addition, the machine housing 44 has a second bearing cover 64 on which a second bearing 66 for mounting the second rotor bearing section 50 is positioned. Extending between the two bearing covers 60, 64 is a cylinder section 68 to which the stator 42 is secured. The cylinder section 68 has a cavity through which a cooling fluid 71 can be guided, as is indicated schematically in FIG. 2 by arrows. The electric machine 40, in particular the stator 42 thereof, can be cooled by means of the cooling fluid 71.

The machine output shaft 52 has a first section 72 which extends out of the machine housing 44, specifically through an opening in the second bearing cover 64. The first section 72 of the machine output shaft 52 is connected to an input element 74 of the gearbox 56. The gearbox 56 is embodied here as a single planetary gearwheel set. In the present case, a sun gear 74 of the planetary gearwheel set forms the input element of the gearbox 56. The sun gear 74 is rigidly connected to the machine output shaft 52 or formed in one piece therewith.

The planetary gearwheel set also has a planetary carrier 78 on which a multiplicity of planetary gears 76 are rotatably mounted. In addition, the planetary gearwheel set includes a ring gear 80 which is embodied fixed to the housing. To be more precise, the ring gear 80 is secured to an outer axial side of the second bearing cover 64.

The planetary carrier has, starting from the planetary gears 76, an outwardly extending projection which is mounted by means of a third bearing 82. To be more precise, the third bearing 82 is secured to a gearbox housing 54 which is embodied essentially in the manner of a cover and is connected to the second bearing cover 64 to form an enclosed gearbox space. The third bearing 82 is embodied as a double-row roller bearing, in particular as an angular contact ball bearing. The end of the machine output shaft 52 which extends out of the machine housing 44 is also indirectly mounted on the third bearing 82 by means of the planetary gearwheel set.

The projection of the planetary carrier 78 which extends outward extends out of the gearbox housing 54 and is connected to an output flange 84, which can be connected to a drive shaft which can be connected to the assigned driven wheel 18.

A second section 86 of the machine output shaft 52 extends out of the machine housing 44, specifically through an opening in the first bearing cover 60. The first bearing cover 60 has here an axial cutout into which the second section 86 extends. A sensor arrangement 88 is provided on the second section 86 of the machine output shaft 52 and/or on the assigned first rotor bearing section 48. The sensor arrangement 88 can be configured, for example, to sense the rotational position or the rotational speed of the machine output shaft 52. The sensor arrangement 88 is preferably arranged in the axial cutout of the first bearing cover 60 in such a way that the sensor arrangement 88 does not extend beyond the axial end side of the first bearing cover 60 in the axial direction.

Figure 2:
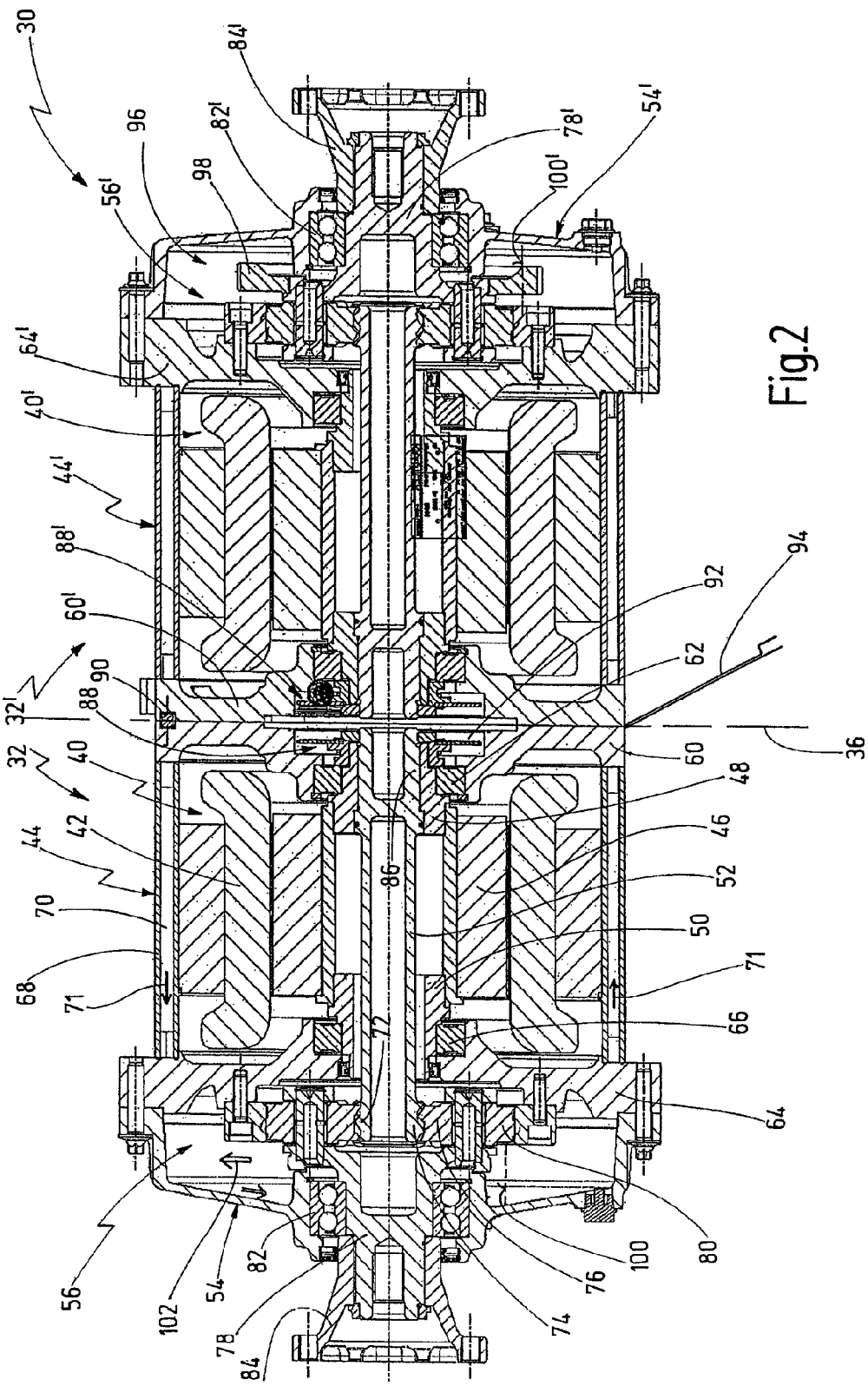
FIG. 2 shows a longitudinal sectional view through a further embodiment of an electric axle according to the invention.

As is also shown in FIG. 2, the two first bearing covers 60, 60' of the two machine arrangements 32, 32' are directly connected to one another by means of a schematically indicated flange connection 90 such that their respective axial cutouts define a sensor space 92 in which the sensor arrangements 88, 88' of the two machine arrangements 32, 32' are accommodated.

In addition, an electrical connection 94 (indicated only schematically in FIG. 2) is provided on at least one of the first bearing covers 60, 60' in the region of the flange connection 90. This connection 94 can serve to supply power to the electric machines 40, 40' and to operate the sensor arrangements 88, 88'. In addition, a sensor signal for transmission to a control device 31 can be led out via the electrical connection 94.

As mentioned above, the two machine arrangements 32, 32' are of generally identical design and arranged mirror-symmetrically with respect to a longitudinal axis 36 of the vehicle (or an axle parallel thereto). However, in order to configure a parking lock function a parking lock arrangement 96 is provided in just one of the two gearbox housings 54, 54', specifically in the gearbox housing 54'. The parking lock arrangement 96 has, in a manner known per se, a parking lock wheel 98 which is secured to the planetary carrier 78' in the present case. In addition, the parking lock arrangement 96 has, although this is not shown in FIG. 2, a latch or the like which is configured to engage in toothing of the parking lock wheel 98 in order to bring about the parking lock function. The latch is secured in a pivotable fashion on the outside of the second bearing cover 64' or on the gearbox housing 54'.

The gearboxes 56, 56' and the assigned third bearings 82, 82' can be supplied by splash lubrication with lubricant without an oil pump. For this purpose, an oil sump 100 is provided in each of the gearbox housings 54, 54', into which oil sumps 100 at least one movable part of the planetary gearwheel set projects, for example in each case one of the planetary gears or the parking lock wheel 98. Oil is thrown out of the oil sump 100 as a result of the respectively dipping-in gearbox element, as is shown in 102, drops down the inner wall of the outer section of the gearbox housing 54 and is conducted from there to the axially outer side of the third bearing 82 via suitable openings (not illustrated). The oil is subsequently fed inward in the axial direction through the third bearing 82 and into the planetary carrier in order to lubricate the planetary gears 76 from the inside via said planetary carrier. For this purpose, the planetary carrier is configured in such a way that it engages over a shoulder of the gearbox housing 54 in order to avoid oil being thrown out again radially to the outside between the third bearing 82 and the planetary carrier 78.

What is claimed is:

1. Electric axle for a motor vehicle, having two electric machine arrangements which are arranged in an minor-inverted fashion with respect to one another, each of the electric machine arrangements, comprising:
    an electric machine having a stator and a rotor, the rotor having two axial ends, wherein a first rotor bearing section is connected to one axial end of the rotor, and wherein a second rotor bearing section is connected to the other axial end of the rotor;
    a machine housing;
    a gearbox having an input element; and
    at least one driveshaft which can be connected to a driven wheel of the motor vehicle;
    wherein the electric machine is connected via the gearbox to the at least one drive shaft;
    wherein the stator of the electric machine is fixed to the machine housing;
    wherein the rotor of the electric machine is connected to the input element of the gearbox,
    wherein the rotor is rotatably mounted on the machine housing by means of a first and a second bearing which engage the first and the second rotor bearing section, respectively,
    wherein the first rotor bearing section is connected to a machine output shaft which is connected to the input element of the gearbox,
    wherein the machine output shaft is guided through the second rotor bearing section such that the machine output shaft is adjacent to the second rotor bearing section but does not contact the second rotor bearing section, and
    wherein the machine housings of the machine arrangements each have a first bearing cover which are directly connected to one another, and wherein the first bearing covers of the machine arrangements include axial cutouts that define a sensor space in which respective sensor arrangements of the machine arrangements are accommodated.

2. Electric axle according to claim 1, wherein the electric machine arrangements are arranged in such a way that their respective gearboxes are arranged axially on the outside.

3. Electric axle according to claim 1, wherein the first bearing covers of the machine arrangements have at least one electrical connection for electrically supplying the electric machine arrangement.

4. Electric axle according to claim 1, wherein a parking lock arrangement is accommodated in a gearbox housing of only one of the two machine arrangements.

5. Electric axle according to claim 4, wherein the parking lock arrangement has a parking lock wheel which is secured to a second element of the gearbox.

6. Electric axle for a motor vehicle, having two electric machine arrangements which are arranged in an mirror-inverted fashion with respect to one another, each of the electric machine arrangements comprising:
    an electric machine having a stator and a rotor, the rotor having a first and a second rotor bearing section;
    a machine housing;
    a gearbox having an input element; and
    at least one driveshaft which can be connected to a driven wheel of the motor vehicle;
    wherein the electric machine is connected via the gearbox to the at least one drive shaft;

wherein the stator of the electric machine is fixed to the machine housing;
wherein the rotor of the electric machine is connected to the input element of the gearbox;
wherein the machine housings of the machine arrangements each have a first bearing cover which are directly connected to one another, and wherein the first bearing covers of the machine arrangements include axial cutouts that define a sensor space in which respective sensor arrangements of the machine arrangements are accommodated.

7. Electric axle according to claim 6, wherein the electric machine arrangements are arranged in such a way that their respective gearboxes are arranged axially on the outside.

8. Electric axle according to claim 6, wherein the first bearing covers each extend in a radial direction.

* * * * *

UNITED STATES PATENT AND TRADEMARK OFFICE
CERTIFICATE OF CORRECTION

| | |
|---|---|
| PATENT NO. | : 8,641,568 B2 |
| APPLICATION NO. | : 13/450292 |
| DATED | : February 4, 2014 |
| INVENTOR(S) | : Knoblauch et al. |

It is certified that error appears in the above-identified patent and that said Letters Patent is hereby corrected as shown below:

Title page, (item 75, Inventors) lines 1-2, Change "Utergruppenbach (DE);" for Daniel Knoblauch to --Untergruppenbach (DE);--.

Title page, (item 73, Assignee) line 2, Change "Hagenmayer" to --Hagenmeyer--.

In the Specification

Column 5 at line 22, Change "20," to --20,30--.

Signed and Sealed this
Seventh Day of October, 2014

Michelle K. Lee
*Deputy Director of the United States Patent and Trademark Office*